US007423106B2

(12) United States Patent
Doane et al.

(10) Patent No.: US 7,423,106 B2
(45) Date of Patent: Sep. 9, 2008

(54) SUPERABSORBENT POLYMER PRODUCT AND USE IN AGRICULTURE

(75) Inventors: Steven William Doane, Morton, IL (US); William McKee Doane, Morton, IL (US)

(73) Assignee: Absorbent Technologies, Inc., Beavverton, OR (US)

( * ) Notice: Subject to any disclaimer, the term of this patent is extended or adjusted under 35 U.S.C. 154(b) by 0 days.

(21) Appl. No.: 11/269,214

(22) Filed: Nov. 7, 2005

(65) Prior Publication Data

US 2006/0058502 A1 Mar. 16, 2006

Related U.S. Application Data

(62) Division of application No. 10/762,956, filed on Jan. 21, 2004, now Pat. No. 7,009,020, which is a division of application No. 10/265,500, filed on Oct. 7, 2002, now Pat. No. 6,800,712.

(51) Int. Cl.
*C08H 5/04* (2006.01)
*A01C 1/06* (2006.01)

(52) U.S. Cl. ......................... 527/103; 527/312; 47/57.6

(58) Field of Classification Search ................. 527/312, 527/103; 47/57.6
See application file for complete search history.

(56) References Cited

U.S. PATENT DOCUMENTS

| | | | | |
|---|---|---|---|---|
| 3,935,099 | A * | 1/1976 | Weaver et al. | 210/689 |
| 3,981,100 | A | 9/1976 | Weaver et al. | |
| 3,985,616 | A | 10/1976 | Weaver et al. | |
| 3,997,484 | A | 12/1976 | Weaver et al. | |
| 4,076,663 | A | 2/1978 | Masuda et al. | 525/54.31 |
| 4,134,863 | A * | 1/1979 | Fanta et al. | 524/602 |
| 4,155,888 | A * | 5/1979 | Mooth | 527/314 |
| 4,194,998 | A | 3/1980 | Fanta et al. | |
| 4,323,487 | A * | 4/1982 | Jones et al. | 525/54.32 |
| 4,483,950 | A | 11/1984 | Fanta et al. | |
| 5,350,799 | A | 9/1994 | Woodrum et al. | 525/54.3 |
| 5,821,286 | A * | 10/1998 | Xu et al. | 524/47 |
| 5,965,149 | A | 10/1999 | Silver | 424/405 |
| 2003/0020043 | A1 | 1/2003 | Barresi et al. | 252/194 |

OTHER PUBLICATIONS

"Absorbent Polymers from Starch and Flour Through Graft Polymerization of Acrylonitrile and Comonomer Mixtures," by G. F. Fanta, R. C. Burr, W. M. Doane, and C. R. Russell, *Northern Regional Research Laboratory, Agricultural Research Service, U. S. Department of Agriculture*, Peoria, Illinois 61604; Starch/Stärke 30 (1978) Nr. 7, S. 237-242.
"Swelling and Rheology of Saponified Starch-g-Polyacrylonitrile Copolymers. Effect of Starch Granule Pretreatment and Grafted Chain Length," by N. W. Taylor, G. F. Fanta, W. M. Doane, and C. R. Russell, *Northern Regional Research Center, Agricultural Research Service, U.S. Department of Agriculture*, Peoria, Illinois 61604; Journal of Applied Polymer Science, vol. 22, 1343-1357 (1978).
"A Practical Process for the Preparation of Super Slurper, a Starch-Based Polymer with a Large Capacity to Absorb Water," by M. O. Weaver, R. R. Montgomery, L. D. Miller, V. E. Sohns, G. F. Fanta, and W. M. Doane, *Northern Regional Research Center, Agricultural Research Service, U. S. Department of Agriculture*, Peorie, Illinois 61604 (USA); Die Stärke, Jahrg. 1977 / Nr. 12, S. 410-413.
"Graft Copolymers of Starch-Polyscrylonitrile Prepared by Ferrous Ion-Hydrogen Peroxide Initiation," by Edward I. Stout, Donald Trimnell, William M. Doane, and Charles R. Russell, *Northern Regional Research Center, Agricultural Research Service, U. S. Department of Agriculture*, Peoria, Illinois 61604; Journal of Applied Polymer Science, vol. 21, 2565-2573 (1977).
"Rheology of a Cellulose Graft Copolymer. Comparison with Other Closely Packed Gel Thickeners," by N. W. Taylor and E. B. Bagley, *Northern Regional Research Laboratory, Agricultural Research Service*, Peoria, Illinois 61604; Journal of Applied Polymer Science, vol. 21, 1607-1613 (1977).
"Tailoring Closely Packed Gel-Particle Systems for Use as Thickening Agents," by N. W. Taylor and E. B. Bagley, *Northern Regional Research Laboratory, Agricultural Research Service, U. S. Department of Agriculture*, Peoria, Illinois 61604; Journal of Applied Polymer Science, vol. 21, 113-122 (1977).
"Rheology of Dispersions of Swollen Gel Particles," by N. W. Taylor and E. B. Bagley, *Northern Research Laboratory, Agricultural Research Service, U. S. Department of Agriculture*, Peoria, Illinois 61604; Journal of Polymer Science: Polymer Physics Edition; vol. 13, 1133-1144 (1975).
"Starch-Polyacrylonitrile Copolymers. Properties of Hydrogels," by E. B. Bagley and N. W. Taylor, *Northern Regional Research Laboratory, Agricultural Research Service, U. S. Department of Agriculture*, Peoria, Illinois 61604; I&EC Product Research & Development, vol. 14, p. 105, Jun. 1975.
"Super Slurper Compound with a Super Thirst," reprinted from Agricultural Research, Jun. 1975; published by the Agricultural Research Service, U. S. Department of Agriculture.
"A Polymeric Absorbent Seeks Problems to Solve," by George F. Fanta, M. Ollidene Weaver, and William M. Doane, *Northern Regional Research Laboratory, Agricultural Research Service, U. S. Department of Agriculture*, Peoria, Illinois 61604;; reprinted from Chemical Technology, vol. 4, Nov. 1974, pp. 675-676.
"Dispersions or Solutions? A Mechanism for Certain Thickening Agents", by N. W. Taylor and E. B. Bagley, *Northern Regional Research Laboratory, Agriculture Research Service, U. S. Department of Agriculture*, Peoria, Illinois 61604; Journal of Applied Polymer Science, vol. 18, pp. 2747-2761 (1974).

(Continued)

*Primary Examiner*—Thao T. Tran
(74) *Attorney, Agent, or Firm*—Stoel Rives LLP

(57) ABSTRACT

A superabsorbent starch graft copolymer product having particle sizes useful in granule applicators for application to agricultural fields. Starch graft copolymers applied to field crops provide excellent anti-crusting properties, increased seed germination and stand, increased crop growth, increased yields, and reduced water requirements.

16 Claims, No Drawings

OTHER PUBLICATIONS

"Gel Sheets Produced by Hydration of Films from the Potassium Salt of Hydrolyzed Starch-Polyacrylonitrile Graft Copolymer," by M. O. Weaver, E. B. Bagley, G. F. Fanta, and W. M. Doane, *Northern Regional Research Laboratory, Agricultural Research Service, U.S. Department of Agriculture*, Peoria, Illinois 61604; Applied Polymer Symposium No. 25, 97-102 (1974).

"Hydrolyzed Starch-Polyacrylonitrile Graft Copolymer Solutions: Effect of Shear History on Transient and Steady-State Viscoelastic Behavior," by E. B. Bailey and N. W. Taylor; *Northern Regional Research Laboratory, Agricultural Research Service, U. S. Department of Agriculture*, Peoria, Illinois 61604; J. Polymer Sci.: Symposium No. 45, 185-196 (1975).

"Kinetics of Grafting Acrylonitrile onto Starch," by L. A. Gugliemelli, C. L. Swanson, and W. M. Doane, *Northern Regional Research Laboratory, Agricultural Research Service, U. S. Department of Agriculture*, Peoria, Illinois 61604; Journal of Polymer Science: Polymer Chemistry Edition, vol. II, 2451-2462 (1973).

"Continuous Production of Acrylonitrile-Starch Graft Copolymers by Ceric Ion Catalysis," by Zoila Reyes, Carroll F. Clark, Frederick Dreier, and Russell C. Phillips, *Stanford Research Institute*, Menlo Park, Calif. 94025; and C. R. Russell and C. E. Rist, *Northern Regional Research Laboratory, Agricultural Research Service, U. S. Department of Agriculture*, Peoria, Illinois 61604; reprinted from I&EC Process Design & Development, vol. 12, p. 62, Jan. 1973.

"Polyacrylonitrile Distribution in Grafted Starch Granules Determined by Scanning Electron Microscopy," by George F. Fanta, F. L. Baker, Robert C. Burr, W. M. Doane, and C. R. Russell, Peoria, Illinois (USA); Die Stärke 25, Jahrg. 1973 / Nr. 5, S. 157-161.

"Starch-Cerium(IV) Complexes in Aqueous Media: Formation, Isolation, and Stability," by L. A. Gugliemelli, W. M. Doane, C. R. Russell, and C. L. Swanson, *Northern Regional Research Laboratory, Agricultural Research Service, U. S. Department of Agriculture*, Peoria, Illinois 61604; Polymer Letters, vol. 10, pp. 415-421 (1972).

"Hydrolyzed Starch-Polyacrylonitrile Graft Copolymers: Effect of Structure on Properties," by M. O. Weaver, L. A. Gugliemelli, W. M. Doane, and C. R. Russell, *Northern Regional Research Laboratory, Northern Marketing and Nutrition Research Division, Agricultural Research Service, U. S. Department of Agriculture*, Peoria, Illinois 61604; Journal of Applied Polymer Science, vol. 15, pp. 3015-3024 (1971).

"Molecular Weight Distribution of the Polyacrylonitrile Moiety of Starch-Polyacrylonitrile Graft Copolymers," by L. A. Gugliemelli, M. O. Weaver, C. R. Russell, and C. E. Rist, *Northern Regional Research Laboratory, Agricultural Research Service, U. S. Department of Agriculture*, Peoria, Illinois 61604; Polymer Letters, vol. 9, pp. 151-155 (1971).

"Rheological Method of Investigating Reaction between Cerium(IV) and Starch," by L. A. Gugliemelli, M. O. Weaver and C. R. Russell, *Northern Regional Research Laboratory, Agricultural Research Services, U. S. Department of Agriculture*, Peoria, Illinois 61604; Polymer Letters, vol. 9, pp. 711-716 (1971).

"Copolymers of Starch and Polyacrylonitrile. Influence of Granule Swelling on Copolymer Composition under Various Reaction Conditions," by George F. Fanta, Robert C. Burr, C. R. Russell, and C. E. Rist, *Northern Regional Research Laboratory, a laboratory of the Northern Utilization Research and Development Division, Agricultural Research Service, U. S. Department of Agriculture*, Peoria, Illinois 61604; J. Macromol. Sci.-Chem., A4(2), pp. 331-339 (1970).

"Modification of Wheat Starch by Initiating Systems Used for Graft Polymerization," by George F. Fanta, Robert C. Burr, C. R. Russell, and C. E. Rist, *Northern Regional Research Laboratory, a laboratory of the Northern Utilization Research and Development Division, Agricultural Research Service, U. S. Department of Agriculture*, Peoria, Illinois 61604; Reprinted from Cereal Chemistry, Jan. 1970, vol. 47, No. 1, pp. 85-91.

"Base-Hydrolyzed Starch-Polyacrylonitrile (S-PAN) Graft Copolymer. S-PAN-1:1, PAN M. W. 794,000," by L. A. Gugliemelli, M. O. Weaver, C. R. Russell, and C. E. Rist, *Northern Regional Research Laboratory, Northern Utilization Research and Development Division, Agricultural Research Service, U. S. Department of Agriculture*, Peoria, Illinois 61604; Journal of Applied Polymer Science, vol. 13, pp. 2007-2017 (1969).

"Copolymers of Modified Starches with Polyacrylonitrile," by George F. Fanta, Robert C. Burr, C. R. Russell, and C. E. Rist, *Northern Regional Research Laboratory, Northern Utilization Research and Development Division, Agricultural Research Service, U. S. Department of Agriculture*, Peoria, Illiois 61604; Journal of Polymer Science: Part A-1, vol. 7, pp. 1675-1681 (1969).

"Copolymers of Starch and Polyacrylonitrile: The Dilution Effect," by George F. Fanta, Robert C. Burr, C. R. Russell, and C. E. Rist, *Northern Regional Research Laboratory, Northern Utilization Research and Development Division, Agricultural Research Service, U. S. Department of Agriculture*, Peoria, Illinois 61604; Journal of Applied Polymer Science, vol. 13, pp. 133-140 (1969).

"Copolymers of Starch and Polyacrylonitrile: The Soluble Fraction," by George F. Fanta, Glen E. Babcock, and Robert C. Burr, *Northern Regional Research Laboratory, Northern Utilization Research and Development Division, Agricultural Research Service, U. S. Department of Agriculture*, Peoria, Illinois 61604; Journal of Polymer Science: Part A-1, vol. 7, pp. 980-982 (1969).

"Copolymers of Starch and Polyacrylonitrile: Effect of Aqueous—Organic Solvent Systems on Copolymer Composition," by Robert C. Burr, George F. Fanta, C. R. Russell, and C. E. Rist, *Northern Regional Research Laboratory, a laboratory of the Northern Utilization Research and Development Division, Agricultural Research Service, U. S. Department of Agriculture*, Peoria, Illinois 61604; J. Macromol. Sci.—Chem., A2(1), pp. 93-101 (1968).

"Graft Copolymers of Starch. III. Copolymerization of Gelatinized Wheat Starch with Acrylonitrile. Influence of Chain Modifiers on Copolymer Compositions," by George F. Fanta, Robert C. Burr, C. R. Russell, and C. E. Rist, *Northern Regional Research Laboratory, Northern Utilization Research and Development Division, Agricultural Research Service, U. S. Department of Agriculture*, Peoria, Illinois 61604; Journal of Applied Polymer Science, vol. 11, pp. 457-463 (1967).

"Influence of Swelling and Disruption of the Starch Granule on the Composition of the Starch-Polyacrylonitrile Copolymer," by Robert C. Burr, George F. Fanta, C. R. Russell, and C. E. Rist, *Northern Regional Research Laboratory, Agricultural Research Service, U. S. Department of Agriculture*, Peoria, Illinois 61604; J. Macromol. Sci.—Chem., A1(7), pp. 1381-1385, Nov. 1967.

"Graft Copolymers of Starch. I. Copolymerization of Gelatinized Wheat Starch with Acrylonitrile. Fractionation of Copolymer and Effecet of Solvent on Copolymer Composition," by George F. Fanta, Robert C. Burr, C. R. Russell, and C. E. Rist, *Northern Regional Research Laboratory, Northern Utilization Research and Development Division, Agricultural Research Service, U. S. Department of Agriculture*, Peoria, Illinois 61604; Journal of Applied Polymer Science, vol. 10, pp. 929-937 (1966).

"Graft Copolymers of Starch. II. Copolymerization of Gelatinized Wheat Starch with Acrylonitrile: Influence of Reaction Conditions on Copolymer Composition," by George F. Fanta, Robert C. Burr, C. R. Russell, and C. E. Rist, *Northern Regional Research Laboratory, Agricultural Research Service, U. S. Department of Agriculture*, Peoria, Illinois 61604; Polymer Letters, vol. 4, pp. 765-769 (1966).

"Starch-Encapsulated Pesticides: ARS Papers Presented at the International Seminar on Research and Development of Controlled-Release Formulations of Pesticides", Vienna, Austria Sep. 6-10, 1993 United States Department of Agriculture; Agricultural Service; 1995-1; Nov. 1994.

Office Action mailed on Mar. 19, 2007 in regards to U.S. Appl. No. 11/013,664.

Office Action mailed on Aug. 8, 2007 in regards to U.S. Appl. No. 11/013,664.

Office Action mailed on Mar. 19, 2007 in regard to U.S. Appl. No. 11/500,698.

Office Action mailed on Aug. 2, 2007 in regard to U.S. Appl. No. 11/500,698.

Office Action mailed on Mar. 19, 2007 in regard to U.S. Appl. No. 11/213,563.

Office Action mailed on May 9, 2007 in regard to U.S. Appl. No. 11/213,563.

* cited by examiner

SUPERABSORBENT POLYMER PRODUCT AND USE IN AGRICULTURE

RELATED APPLICATIONS

This application is a divisional of U.S. patent application Ser. No. 10/762,956, filed Jan. 21, 2004, which is a divisional of U.S. patent application Ser. No. 10/265,500, which issued as U.S. Pat. No. 6,800,712 on Oct. 5, 2004.

BACKGROUND OF THE INVENTION

U.S. Pat. Nos. 3,935,099, 3,981,100, 3,985,616, and 3,997,484, all issued in 1976, describe the formation of a class of materials referred to as "super absorbent polymers" (SAPs). Since 1976, many patents relating to the use and formation of SAPs have issued. While most of these patents disclose compositions made by copolymerizing acrylic acid and acrylamide in the presence of a coupling agent, a few patents describe the use of a natural polymer, such as a starch (see, e.g., U.S. Pat. Nos. 3,935,099, 3,981,100, 3,985,616, and 3,997,484). SAPs made without starch are referred to as "totally synthetic copolymers." Almost all such SAPs are used in baby diapers, adult diapers, catamenials, hospital bed pads, cable coating, and the like. Today the market for totally synthetic copolymer SAPs is estimated to be about 2 billion pounds per year worldwide.

Starch graft copolymer compositions with the ability to absorb up to 1,000 times their weight in aqueous fluids are known in the prior art. The prior art disclosed cross-linked starch graft copolymers that absorb large quantities of aqueous fluids for use in absorbent soft goods, that increase the water-holding capacity of soils, and that act as coatings on seeds, fibers, clay, paper, and the like. The prior art also disclosed methods for creating SAP films by drying the composition in trays or by heating it on drum dryers. These films can then be ground or milled into flakes or powders. In an alternative prior art drying method, a viscous mixture of alkali starch graft copolymer was diluted with a water-miscible organic solvent such as alcohol or acetone. The precipitated alkali starch graft copolymer was then isolated in a fine powder form by filtration and drying.

Agricultural companies that market seed, fertilizer, herbicides, insecticides, and other agricultural materials have found little use for the totally synthetic copolymer SAPs in agriculture because evaluations of these SAPs show poor performance because they are composed of small, fine particles having an 80 mesh size. One inherent limitation of finer-mesh particles is that they cannot be used in typical granule applicators which require particle sizes of at least 25 mesh. Further, the SAP films and powders cannot be applied with granular fertilizers, granular pesticides, or other granular agricultural additives.

The present inventors have recognized a need for a method of producing a granular SAP product for use in large-scale agricultural applications.

SUMMARY OF THE INVENTION

A method of producing a superabsorbent polymer product for use in agricultural applications involves (1) providing grafting reactants and a starch; (2) graft polymerizing the grafting reactants onto the starch to form a starch graft copolymer; (3) saponifying the starch graft copolymer; (4) precipitating the saponified starch graft copolymer; and (5) granularizing the precipitated starch graft copolymer to form particles of superabsorbent polymer product.

A second method of producing a starch graft copolymer for use in agricultural applications involves the following steps: (a) providing grafting reactants and a starch, (b) graft polymerizing the grafting reactants onto the starch to form a starch graft copolymer, (c) saponifying the starch graft copolymer, (d) adding an acid to lower the pH of the starch graft copolymer to between about 2.0 and about 3.5 to form a starch graft copolymer precipitant, (e) separating the starch graft copolymer precipitant, (f) neutralizing the pH of the starch graft copolymer precipitant to between about 6.0 and about 8.0 to form a starch graft copolymer, and (g) granularizing the starch graft copolymer to form particles.

In additional aspects of the present invention, various methods of increasing crop production using a starch graft copolymer produced by one of the above-described methods are disclosed. One method involves applying the granulated starch graft copolymer directly to the soil. A second method involves coating a root or seed with the granulated starch graft copolymer. The application of starch graft copolymers, made by the above-described methods, directly to the soil results in earlier seed germination and/or blooming, decreased irrigation requirements, increased propagation, increased crop growth, increased crop production, and decreased soil crusting. Thus, starch graft copolymers made by the above-described methods offer advantages over the prior art methods for forming and using an SAP in large-scale agriculture.

DETAILED DESCRIPTION OF PREFERRED EMBODIMENTS

There are two methods of making the SAP products of the present invention. In the first method, the SAP product is prepared and rod-shaped starch graft copolymers are formed from a viscous alkali starch graft copolymer. The alkali starch graft copolymers of this invention are produced by graft polymerizing grafting reactants onto a starch. The grafting reactants of this invention include an acrylonitrile and an initiator. The starch may be any starch, flour, or meal. The preferred starch is gelatinized cornstarch. The acrylonitrile may be used alone or in conjunction with other monomers commonly used in the industry. The preferred weight ratio of the starch to the acrylonitrile is in the range of between about 1:2 and about 1:5. The acrylonitrile is graft polymerized onto the starch in the presence of an initiator, preferably a ceric (+4) salt. A preferred initiator is ceric ammonium nitrate, however, other suitable initiator systems known to those skilled in the art may be used. The polymerization is accomplished in several minutes, producing long, grafted chains of polyacrylonitrile (or polyacrylonitrile with other monomers) attached to the starch.

This starch graft copolymer is then saponified with an alkali metal, preferably potassium hydroxide or sodium hydroxide, to change the nitrile groups into a mixture of carboxamides and alkali carboxylates. The saponification step provides a highly viscous mass that must be isolated in a dry form for usage in agriculture.

The resulting saponificate is then precipitated into a solid form and formed into particles having the desired particle size. The isolated product is recovered from the viscous polymer dough using water-miscible solvents such as alcohols. These include methanol, ethanol, propanol, and isopropanol. Since methanol is generally the least expensive of the alcohols, it is often chosen, and it is the preferred alcohol for use in connection with this first method. The dough is immersed in the alcohol, causing the alkali starch graft copolymer to precipitate into particles that are screened to the desired size after drying. Formation of the starch graft copolymer into particles of the desired size for direct use in agricultural equipment may be achieved by converting the viscous mass of starch graft copolymer saponificate into rod-shaped forms and drying the forms to the desired particle size. Selecting an appropriate die can control the size and shape of the rod-shaped forms. The diameter of the rods is controlled by drilling holes having $\frac{1}{16}$-inch to $\frac{1}{4}$-inch diameters in the end plate. For example, an appropriate die would be a plate that has been drilled or formed to contain holes of the selected size and shape. The rod-shaped forms may be lightly coated, after being formed on the die, to reduce their tackiness. Clays, starches, flours, and cellulose can be used to dust the rod-shaped forms.

The first method differs from the second method of forming the granular SAP product of the present invention in that the second method does not use alcohol to effect precipitation. In the second method, an acid-based precipitation occurs followed by separation and neutralization to form a viscous mass that is formed into rod-shaped particles and allowed to air- or oven-dry before screening or grinding.

According to the second method of forming the granular SAP product of the present invention, once the alkali starch graft copolymer is saponified as described above with reference to the first method, the saponificate is precipitated by adding acid until a pH of between about 2.0 and about 3.5, more particularly about 3.0 is reached. The precipitate is then washed, preferably with water, to remove any salts and, if necessary, is separated. Separation methods include settling, centrifuging, and any other mechanical means of separating. The carboxylic acid of the starch graft copolymer is then titrated back to the alkali form with the hydroxide of an alkali metal, preferably potassium hydroxide, to a pH of between about 6.0 and about 8.0, more particularly about 7.0. This viscous mass may then be forced through a die plate, dusted to remove tackiness, and air- or oven-dried. The dried particles are then screened to the appropriate size. If desired, the particles could be ground to a fine powder then formed into pellets of the desired size for use in agriculture.

The SAP product formed by either the first or second method preferably has a particle size of less than about 200 mesh. The most preferred particle size will depend on the specific agricultural application intended. The preferred particle size for agricultural applications that deposit the starch graft copolymer directly into the soil is less than 50 mesh, more particularly between about an 8-mesh to about 25-mesh. This particle size is preferred because the commercially available granular applicators in the industry require this particle size. In order to broadcast or meter the absorbent particle through existing application equipment, an 8-mesh to about 25-mesh SAP product having a density of between about 30 to about 35 pounds per cubic foot is preferred.

Other agricultural applications use a finer particle size, such as seed coating and root dipping. For seed coating, the desired particle size is between about 75 and about 200 mesh, more particularly about 100 mesh. For root coating, the desired particle size is between about 30 and about 100 mesh, more particularly about 50 mesh.

The results of the use of the SAP product produced by the methods of the present invention will be demonstrated in the following examples and tables. Particle sizes between about 8 mesh and about 25 mesh were evaluated on cantaloupe, cotton, and tomato plants, with subsequent field evaluations of 40 additional crops.

Soil crusting occurs as a result of sprinkled irrigation. When the starch graft copolymer was placed on the soil before the planter press wheel was applied, soil crusting was prevented. In fact, a few pounds per acre of the starch graft copolymer gave excellent results when used as an anti-crusting agent (see EXAMPLES 5b and 6a).

When the SAP was added as an anti-crusting agent, tomato plant height was significantly higher in the treated rows than in the untreated rows. The soil below the tomato seeds was treated at a rate of three to ten pounds per acre. Tomato growth was significantly improved by treatment with the starch graft copolymer, as compared with the untreated control rows. Tests on cantaloupe showed that plants treated with the starch graft copolymer bloomed earlier than expected, required less irrigation water, and gave a substantially greater melon yield of more uniform size and shape than did the untreated control group. Tests on cotton demonstrated that the starch graft copolymer treatment produced taller cotton plants, despite a 50% reduction in water supplied to the plant. The treated cotton plants also gave a 10% increase in cotton lint yield as compared with untreated plants. Tests conducted on over 40 additional crop seeds showed no phytotoxicity resulting from the starch graft copolymer.

In the prior art, the starches used to form SAPs were cornstarch, wheat starch, and sorghum starch. The resulting absorbent starch or flour graft copolymers exhibited the ability to absorb a few hundred times to about 1,000 times their weight in water. As part of the present invention, several starches and flours not previously evaluated for their ability to form absorbent starch graft copolymers were analyzed, including corn meal, peeled yucca root, unpeeled yucca root, oat flour, banana flour, and tapioca flour. Absorbent starch graft copolymers were made from these materials, and the water absorbency of each was determined. The results are provided in TABLE 1. Although the absorbent starch graft copolymers were made with two polymerizable monomers (acrylonitrile (AN) and 2-acrylonitrile-2-methyl-propanesulfonic acid (AMPS)), acrylic acid, and acrylamide could also be used.

Cornstarch graft copolymers made with various levels of AN or ceric ammonium nitrate, and saponified with either potassium hydroxide (KOH) or sodium hydroxide (NaOH), were also evaluated. Exemplary starches include, but are not limited to, cornstarch, wheat starch, sorghum starch, tapioca starch, cereal flours and meals, banana flour, yucca flour, and peeled yucca root. These starch sources are preferably gelatinized to provide optimal absorbency. The preferred weight ratio of starch to acrylonitrile is between about 1:2 and about 1:5. Using more AN typically gives somewhat higher absorbency in the isolated product. The absorbent products were isolated after alcohol precipitation, and absorbencies in the ranges of 400-500 grams of water per gram of polymer to 600-700 grams of water per gram of polymer were found (see TABLE 2).

In the prior art, methanol has been the solvent of choice to isolate the copolymer into a solid form. Methanol acts to remove the water from, desalt, and granularize the neutralized alkali starch graft copolymer saponificate. One way is to blend sufficient methanol into the saponificate until a smooth dispersion is reached. Then the smooth dispersion is pumped into a precipitation tank consisting of a stirring system that can vigorously mix the methanol while pumping in the smooth saponificate dispersion. Once mixed, the resulting methanol and absorbent particles are either (a) collected by decanting or washing with methanol, or (b) centrifuging and collecting then drying to a moisture level between about 1 and about 20 percent, more particularly about 10 percent, is achieved. Although this precipitation method makes an extraneous salt-free absorbent particle, there is a wide range of particle sizes formed, with a majority of these particles being finer than 60 mesh (see TABLE 3). These particles are too fine for most large-scale agricultural applications. The fine particles can be pelletized to provide a particle size that would be appropriate for agricultural use or they can be used for seed coating or root dipping.

In an alternative method of precipitating the absorbent starch graft copolymer with methanol to produce larger particle sizes, the surface of the saponificate has been wetted with a small amount of methanol and then chopped into larger "chunks" of saponificate that will not re-adhere. Once the surface of the saponificate has been wetted with methanol, the resulting material is slippery to the touch and is no longer sticky. This effect is achieved by using a compositional ratio of between about one and about two parts of methanol per one part of solids in the saponificate dough.

Once the methanol has been added, the saponificate is either (a) pumped through an in-line chopper to form chunks having a diameter of less than one inch, or (b) hand chopped with scissors. The resulting mixture is then fed into a tank or Waring blender that has between about 1.5 gallons and about 2.0 gallons of additional methanol per pound of saponificate. The methanol in the larger tank is agitated with a Cowles dissolver or other mixer capable of achieving high speeds. Using either precipitation and decanting techniques or centrifugation, the resulting particles were dried and sorted by particle size. This method produced particles that were much larger than those produced by other techniques. The "methanol chopping" method resulted in the formation of starch graft copolymers in which almost 65 percent of the particles formed were in the 8- to 25-mesh range. (See the MCM row of TABLE 3.)

Using the experience gained in the methanol chopping method for particle formation, a third method of methanol precipitation was developed. This technique involves pre-forming the particle size before the methanol precipitation step. The use of dies to form strands or rods having different shapes and diameters greatly improves the particle size formation process. This method facilitates prediction of the final particle size. The saponificate (neutralized or un-neutralized) is forced through a die plate having holes of varying diameter (e.g., about 1/16-inch to more than 1/4-inch) and varying shape (e.g., round, star, ribbon, etc.). Methods of forcing the saponificate through the die plate include the use of a hand-operated plunger, screw-feeding, auguring, pumping, and any other commonly known method. The resulting strands or rods were formed and placed into the precipitation tank without any further addition of methanol as a premixing agent. Wetting the strands or rods with methanol or dusting them with clay, starch, or other natural or synthetic polymers prevented the strands or rods from sticking together. The resulting strands or rods were precipitated with agitated methanol, removed from the tank, and dried. Over 85% of the particles were of similar size and shape (see TABLE 3). As TABLE 3 suggests, this method produces a SAP product that has uniform particle size and that can be used for agricultural applications.

Row MP of TABLE 3 shows the results of a fourth method of methanol precipitation. This method includes use of a moyno pump, having a variable pump speed that pumps the neutralized saponificate through a plastic pipe with a fixed end cap having 1/8-inch holes. The holes can be of any number or pattern. In this test, 50 holes were drilled in the plastic end cap. The end cap was placed several inches above the methanol precipitation tank, which was filled with 50 gallons of agitated methanol. A cover was placed over the precipitation tank, the moyno pump was turned on, and the saponificate was pumped through the pipe and forced through the die plate. To prevent pump overpressure from causing the strands or rods to swell, pump speed was controlled. The resulting strands or rods showed little swelling and were immediately immersed in the agitated methanol. After particle formation and desalting of the polymer, the methanol was decanted and the remaining polymer was dried to a 10% moisture level. The results of this method of particle size formation are very encouraging for commercial production. Of the particles produced, 85% were in the target range of 8- to 25-mesh, with just a small percentage of undersized particles. If smaller-sized particles are desired for seed coating or root dipping, a smaller-diameter die plate can be used.

TABLE 3 shows the results of the dried polymers made by the above methods being passed through a screening system consisting of an 8-mesh screen, followed by a 25-mesh screen, followed by a 60-mesh screen, followed by a 100-mesh screen and a fines collection pan. After screening the dried polymer, the different cuts were collected and weighed. The percentage of each cut was calculated and reported.

Since some SAP manufacturers may not want to use organic solvents to precipitate the starch graft copolymers, an alternative method of recovering absorbent particles having the desired particle size is disclosed. This alternative method does not use methanol as the precipitating agent. Instead, the alkali saponified starch graft copolymer is produced at a pH of between about 10 and about 12 and then an acid is added to adjust the pH to between about 2.0 and about 3.5, more particularly about 3.0. Acids that may be used include inorganic acids such as hydrochloric acid, sulfuric acid, or nitric acid, most preferably hydrochloric acid. Organic acids such as acetic acid can also be used. This step replaces the alkali of the alkali carboxylate in the starch graft copolymer with a proton, thereby yielding a carboxylic acid in the starch graft copolymer. The alkali forms a salt with the acid. If hydrochloric acid is used, then potassium chloride and sodium chloride are formed. Any ammonia that is not removed is converted to ammonia chloride. This acid treatment of the starch graft copolymer causes the copolymer to precipitate. The precipitate is then separated by any means known to those skilled in the art, including any mechanical means, such as settling, filtering, and centrifuging. The starch graft copolymer precipitate is again washed with additional water to remove more of the potassium, sodium, or ammonia salts, and the supernatant is discarded. After most of the salts have been removed by the water washes, the precipitate is then treated with an inorganic base such as potassium hydroxide, sodium hydroxide, or ammonium hydroxide. The inorganic base is generally potassium hydroxide. Potassium hydroxide produces the potassium carboxylate on every carboxylic acid in the starch graft copolymer. A pH between about 6.0 and about 8.0 is achieved upon adding potassium hydroxide. The potassium hydroxide treatment re-suspends the starch graft copolymer to form a highly viscous mass. A pasta maker was used to make rod-shaped extrudates. These extrudates were allowed to air or oven dry. The rod-shaped extrudates were sticky; dusting the rods with clay, starches, flours, celluloses, or celite just after they were formed removed the stickiness. The rod-shape extrudates were then ground to form particles of various sizes. Alternatively, the fine particles could be formed into pellets to provide particles of the preferred size. Pelletizing is common in the polymer industry and is known to those skilled in the art.

The initial agricultural tests were conducted using cantaloupe, cotton, and tomato plants with subsequent tests being performed on over forty additional crops.

Test #1: Cantaloupe Plants

The cantaloupe test methodology involved the following steps:
 1. The trial area was pre-irrigated.
 2. The plant seed was planted in the furrow.

3. Granular starch graft copolymer treatments were applied to the seeded furrow using a microband, ground-driven granule applicator.

4. For each plant type, three separate furrows were planted. A first furrow was treated with starch graft copolymer applied at seven pounds per acre (lb/a). The second furrow was treated with starch graft copolymer applied at four lb/a, and a control plot was not treated with starch graft copolymer.

5. The resulting plants were provided only 50% of the water normally required to grow each individual plant.

6. Evaluations were made at 11, 18, 25, 33, 40, 54, 68, and 75 days. Evaluations included measuring plant height above the soil level, plant weight (stem cut at soil level), plant root weight, plant stem diameter, and plant stress level. Note that the term "significant difference" was mathematically (statistically) defined.

Summary of the Test Results for Cantaloupe

The cantaloupe in the seven lb/a furrow had a significant increase in plant weight compared to the control furrow at the 18-day evaluation. Although it did not always show a significant difference, the cantaloupe in the seven lb/a plot had a greater root weight, plant weight, stem diameter, and plant height at the 25-day evaluation. The cantaloupe in the seven lb/a plot showed less stress and had a greater leaf water potential reading at the 49-day evaluation. The cantaloupe in the seven lb/a plot began blooming three days prior to the control plants. There were considerably more cantaloupe melons harvested from the seven lb/a plot, the melon weight was greater, and the melons were harvested earlier. In summary, cantaloupes planted in soil treated with the granular starch graft copolymer and provided only one-half the normal amount of water required, produced larger, healthier cantaloupe plants which produced more melons, heavier melons, and earlier melons than the control plot cantaloupe plants.

Test #2: Cotton Plants

The same methodology used for the cantaloupe tests was used for the cotton tests, with the exception that evaluations were conducted at 11, 18, and 25 days, at which time the test was terminated because the cantaloupe plants overgrew the cotton plants. The cotton plants were provided only one-half the amount of water normally required to grow cotton. The cotton was planted about 1 inch to about 1.5 inches below the soil surface because cotton would not emerge if planted at a greater depth.

Summary of the Test Results for Cotton

Although there was no significant difference in the early growth of the cotton plants, the cotton in the seven lb/a plot showed greater plant height, plant weight, and root development. There was a significant difference in the leaf water potential of the cotton planted in the seven lb/a granule starch graft copolymer plot as compared to the control plot, as measured at the 18-day evaluation. The cotton in the seven lb/a granule starch graft copolymer plot indicated increased growth in root length, stem diameter, plant weight, and root weight at the 25-day evaluation, as compared to the control plants, although the difference was not statistically significant.

In summary, cotton planted in soil treated with granular starch graft copolymers and watered with only one-half the normal amount of water required to grow cotton plants produced larger, healthier cotton than the control plot. In fact, the cotton lint yield of the seven lb/a furrow saw a 10% increase from the control plot.

Test #3: Tomato Plants

The test methodology for the tomato plants was as follows:

1. In a furrow treated with seven lb/a granule starch graft copolymer, the granule starch graft copolymer was shanked into the bed approximately two inches below the seed.

2. In a furrow treated with four lb/a granule starch graft copolymer, the granule starch graft copolymer was applied as a surface application in front of the press wheel.

3. The tomato seeds were dry planted and then sprinkle irrigated to germinate the seed. One problem associated with sprinkle irrigating is that the soil surface crusts, and the tomato seed cannot break through the crust.

4. The plots were evaluated only at seven days to ascertain the number of germinated seeds that had broken through the crust.

Summary of the Test Results of the Tomato Plants

There was a significant increase in the number of emerged tomato plants treated in the four lb/a granular starch graft copolymer furrow where granule starch graft copolymer had been applied at the surface. This test was specifically intended to evaluate the effect of granular starch graft copolymer on plant germination and on soil crusting. It was concluded that granular starch graft copolymer caused small craters in the soil surface, which enabled the tomato plants to emerge. Subsequent tests confirmed that the granular starch graft copolymer function as an extraordinary anti-crusting agent, which is an especially useful characteristic when planting high cost bio-engineered seeds because this characteristic allows more seeds to germinate.

In the second field test on the tomatoes, the tomato plants were allowed to grow to harvest. Upon evaluation, there was a significant improvement in standing row count for plants treated with the granular starch graft copolymer treatments. Because the effect of the granular starch graft copolymer on seed germination and on preventing soil crusting was highly positive, there was a significant increase in yield of the granular starch graft copolymer-treated plants as compared to the control plants. With granular starch graft copolymer applied over the top of the seed row as an anti-crusting agent, the four lb/a treatment yielded 38.7 tons per acre as compared to 15 tons per acre for the untreated control plants. Using granular starch graft copolymer applications as a side dressing below the seed at the rate of seven lb/a yielded 39.3 tons per acre as compared to 15 tons per acre for the untreated control plants. These higher yields were clearly validated by the initial field test on tomatoes to evaluate the effect of granular starch graft copolymer on plant germination and on soil crusting.

The following examples are intended only to further illustrate the invention and are not intended to limit the scope of the invention, which is defined by the claims.

EXAMPLE 1

In a three-liter resin kettle, distilled water (1400 ml) was charged and the stirrer was turned on. Flour or meal (110 g) was slowly added and allowed to stir for five minutes. A slow stream of nitrogen gas was allowed to bubble into the mixture while the temperature was brought up to 95° C. The mixture was held at that temperature for 45 minutes to ensure complete gelatinization of the starch. The heating mantle was then removed, and a cold water bucket bath put in its place. The mixture was continuously stirred under nitrogen gas until the temperature dropped to 25° C. Then acrylonitrile (115 g) and 2-acrylamido-2-methyl-propanesulfonic acid (AMPS) (23 g) was added. Stirring under nitrogen continued for 10 minutes. A previously made catalyst solution of cerric ammonium nitrate (5.5 g) dissolved in 50 ml of 0.1 M nitric acid solution was added to the resin kettle. The cooling bucket was kept in place to control the exothermal reaction while stirring continued for 60 minutes. The temperature of the grafting was recorded and the exotherm was kept below a 3° C. increase. The temperature of the mixture at the end of the 60 minutes was 40° C. After 60 minutes of stirring under nitrogen, the nitrogen was removed and a solution of potassium hydroxide flakes (90 g) dissolved in water (200 g) was added to the resin kettle while stirring. The heating mantle was put back under the resin kettle and the mixture was heated to 95° C. and held there for 60 minutes. After 60 minutes, the heating mantle was removed and the pH of the mixture was recorded. The mixture was then neutralized to a pH of 7.5 with a 10% solution of hydrochloric acid. The cooling bath was put back under the resin kettle and the dough was cooled to about 40° C. The viscous dough was precipitated into methanol contained in a Waring Blender. Absorbency of the isolated precipitates was recorded, and is shown in TABLE 1.

TABLE 1

| Natural Material | Absorbency (g water/g product) |
|---|---|
| Tapioca Flour | 300-400 |
| Corn Meal | 300-400 |
| Peeled *Yucca* Root | 200-300 |
| Unpeeled *Yucca* Root | 200-300 |
| Oat Flour | 300-400 |
| Banana Flour | 200-300 |
| Wheat Flour | 500-600 |

EXAMPLE 2

Cornstarch was graft polymerized with acrylonitrile (AN) as a monomer and with ceric ammonium nitrate using the procedure reported in EXAMPLE 1. For each 110 grams of cornstarch used, 1400 ml of distilled water was used. For the saponification caustic, either potassium hydroxide or sodium hydroxide was used (see TABLE 2 for the amount of caustic used). The absorbency of the isolated products was measured by taking one gram of dried polymer and placing it in a beaker with a known amount of distilled water in it. The polymer was allowed to free swell for 30 minutes. The unabsorbed water, if any, was decanted and the volume of the absorbent water was measured. (See the Absorbency column of TABLE 2.)

TABLE 2

| Starch | AN (g) | Ce (g) | KOH (g) | NaOH (g) | Absorbency (g) |
|---|---|---|---|---|---|
| Cornstarch | 115 | 5.5 | 75 |  | 400-500 |
| Cornstarch | 115 | 5.5 |  | 75 | 400-500 |
| Cornstarch | 135 | 5.5 | 90 |  | 500-600 |
| Cornstarch | 135 | 5.5 |  | 90 | 500-600 |
| Cornstarch | 115 | 5.5 | 90 |  | 400-500 |
| Cornstarch | 115 | 5.5 |  | 90 | 400-500 |
| Cornstarch | 115 | 5.5 | 90 |  | 400-500 |
| Cornstarch | 115 | 5.5 | 90 |  | 400-500 |
| Cornstarch | 115 | 5.5 | 90 |  | 400-500 |
| Cornstarch | 115 | 5.5 | 90 |  | 400-500 |
| Cornstarch | 115 | 5.5 | 90 |  | 400-500 |
| Cornstarch | 115 | 5.5 | 90 |  | 400-500 |
| Cornstarch | 115 | 5.5 | 90 |  | 400-500 |
| Cornstarch | 150 | 6.0 | 120 |  | 500-600 |
| Cornstarch | 150 | 6.0 | 120 |  | 500-600 |
| Cornstarch | 150 | 6.0 |  | 120 | 600-700 |
| Cornstarch | 150 | 6.0 |  | 120 | 500-600 |
| Cornstarch | 150 | 6.0 |  | 120 | 500-600 |

EXAMPLE 3

Pilot scale runs were made in a 100 cubic foot ribbon blender. The ribbon blender was charged with water (4,000 lb), to which was added cornstarch (342 lb). The mixture was then heated to 95° C. to gelatinize the starch. After about 30 minutes, the heated gelatinized starch was cooled to about 25° C. and 345 pounds of acrylonitrile was added with agitation. After a homogenized mixture was achieved, a mixture of ceric ammonium nitrate (7.8 lb) dissolved in 0.1 M nitric acid (140 lb) was added as stirring continued. After 30 minutes, commercial potassium hydroxide (445 lb) was added, and steam was applied to heat the reaction mass to 95° C. This reaction mass was held at this temperature for approximately one hour. The thick, viscous, dough-like material was later isolated as an absorbent polymer by several procedures:

a. To recover a crude material, the dough-like mass was neutralized to a pH of between about 6.5 and about 8.5 and then fed onto a heated drum dryer to provide crude flakes of absorbent polymer. Since all the extraneous salts are contained in the flakes, the absorbency of the flakes is about 200 times in distilled water.

b. To recover a fine particle size of refined absorbent particles, methanol was slowly added to the neutralized dough-like material until a smooth dispersion was achieved. The resulting dispersion was then slowly fed into a Waring Blender. The material formed fine particles and the methanol was decanted. The fine particles were collected and placed into a Waring Blender with fresh, clean methanol and were washed again to remove extraneous salts. The particles were then decanted or filtered. The fine particles were collected, dried, and sieved through a series of wire mesh screens to provide different particle sizes as shown in the NP row of TABLE 3. The particles are rather fine but can be pelletized into larger particles.

c. In order to obtain a greater yield of particles of absorbent polymer in the 8- to 25-mesh range, approximately 100 pounds of neutralized dough-like mass was added to a 20 gallon stainless steel bowl and was wetted with a small amount of methanol (one to two pounds of methanol per pound of dough). The dough-like mass was then chopped with scissors or shears into large pieces of dough. These pieces of dough ranged in size from one-half inch to two inches in diameter. The methanol-wetted pieces did not adhere to each other, unlike pieces of dough that were not wet with methanol. The pieces of methanol-wetted dough were fed into a 55-gallon stainless steel open-top tank that was agitated with a Cowles Disperser. The stainless steel tank contained between 25 gallons and 30 gallons of methanol (approximately 1.5 gallons of methanol per 5 pounds of neutralized dough). The Cowles Disperser was operated at high speed. The pieces of dough broke up further to yield large particles of granular absorbent particles. The methanol was decanted, and an additional 0.5 to 1 gallon of methanol per 5 pounds of dough was added during agitation with the Cowles Disperser. After the methanol was decanted, the resulting particles were hard to the touch. The particles were filtered and dried in a vacuum oven until a 10% moisture level was reached. The dried particles were screened through a series of wire meshes to provide distributions as shown in the MCM row of TABLE 3.

d. Since the dough-like saponificate gave larger absorbent particles after the saponificate mass was cut into smaller pieces, the dough may be formed into rods or spaghetti strands before adding methanol. The neutralized saponificate was forced through dies with holes ranging in diameter from 1/16 inch to 1/4 inch that were round-shaped or star-shaped. The dough was forced through these dies by hand-operated plungers, screw fed systems, or an augur. The extruded dough was formed and immediately placed into methanol, which prevented the forms from sticking together. The forms were then agitated while in methanol, filtered, and dried to a 10% moisture level. The dried particles were then screened through a series of wire meshes. The particle size distribution of the forms is shown in the EP row of TABLE 3.

e. A moyno pump with a variable speed was used to pump the neutralized saponificate through a plastic pipe having a fixed end cap in which 50 1/8-inch holes were drilled. The end cap was placed several inches above a methanol precipitation tank containing 50 gallons of agitated methanol. Spaghetti strands were formed when the saponificate was pumped through the pipe and the end cap die plate. The pump was run at a speed that did not overpressurize the pipe and cause the spaghetti strands to swell after forming. The formed spaghetti strands were sheared off the end cap by the force of the methanol being agitated. The forms further broke up in the agitated methanol. The methanol was decanted, and additional washing with fresh methanol was done. The resulting particles were filtered and dried to a 10% moisture level. The particles were then mesh screened such that about 85% of the particles were in the target range of 8- to 25-mesh in diameter, as shown in the MP row of TABLE 3.

TABLE 3

| Precipitation Technique | >8 mesh | 8- to 25- mesh | 25- to 60- mesh | 60- to 100-mesh | >100 mesh |
|---|---|---|---|---|---|
| Normal Precipitation Method (NP) | 0% | 4% | 21% | 44% | 31% |
| Methanol Chopped Method (MCM) | 8% | 65% | 15% | 12% | <1% |
| Extruded Precipitation Method (EP) (1/8" holes) | <1% | 84% | 11% | 5% | <1% |
| Extruded Precipitation Method (EP) (1/16" holes) | <1% | 9% | 73% | 16% | 2% |
| Extruded Precipitation Method (EP) (1/4" holes) | 23% | 61% | 14% | <1% | <1% |
| Moyno Pump Method (MP) | 0% | 85% | 12% | 3% | <1% |

EXAMPLE 4

A three-liter resin kettle was charged with distilled water (700 g) and cornstarch (70 g) was added with stirring. The stirrer was a double helix design, but other stirrer designs could be used. Nitrogen gas was bubbled through the stirred starch dispersion. The dispersion was then heated to a temperature between 88° C. and 91° C., which temperature was maintained for at least 30 minutes. After the gelatinized starch dispersion was heated, it was cooled to a temperature between 25° C. and 35° C. by replacing the heating mantle with a cooled water/ice bucket. The cooled dispersion was treated with acrylonitrile (96 g) and stirring continued for 10 minutes. Then ceric ammonium nitrate (3.8 g) dissolved in water (10-20 ml) was charged into the starch-acrylonitrile mixture in the resin kettle while the kettle remained immersed in the cooling bucket. Note that the ceric ammonium nitrate solution could be made with a nitric acid solution. The mixture was agitated for about 45 minutes while the graft polymerization reaction occurred. After the reaction ran to completion, the resin kettle was placed in a heating mantle. One liter of water containing sodium hydroxide (45.8 g) was added over a 15-minute period during continued stirring and heating. The system was heated to a temperature between 90° C. and 95° C. and held at that temperature for 60 minutes. Ammonia gas was liberated during the final 20 minutes of this saponification reaction. The ammonia gas could be removed and recovered under a vacuum. The saponificant was cooled to ambient temperature and the pH was adjusted to between 2.0 and 3.2 by adding 10% hydrochloric acid solution. Note that other acids could be used to adjust the pH. At this low pH, the acid form of the starch-g-polyacrylonitrile saponified polymer becomes insoluble and settles as a precipitant in the resin kettle. Upon settling, filtering or centrifuging the acid effects separation from most of the neutralization salts. Additional water washing of the precipitant removes more of these neutralization salts until the acidified saponified polymer is mostly "salt free." The lower the neutralization salt content in this acidified saponified polymer, the higher the final absorbency of the potassium or sodium carboxylate form of the starch graft copolymer. The solid content of this acidified saponified polymer after centrifugation is about 15%. If higher solids are desired, further dewatering steps must be performed. This can be achieved by drying the acidified starch graft copolymer to a moisture level of between 1% to 20% or by washing the acidified starch graft copolymer with a dewatering agent such as methanol. The acidified starch graft copolymer was then treated with potassium hydroxide to adjust the pH to between 6.0 and 8.0. This treatment converted all of the acid carboxylate groups to the potassium salt form. A food extruder, the Ron Popeli Pasta maker, was used to extrude rods or spaghetti strands. The thickened potassium salt form of the graft polymer was extruded into small rods. If the rods stuck together, they were dusted with additional starch or clays, or were wetted with methanol, all of which keep the rods from sticking together. The rods were then dried in a forced air or vacuum oven to achieve a moisture content of about 12%. When dry, the rods were ground to a particle size of 8- to 25-mesh for agricultural evaluation. Particles that were finer than 25 mesh can be formed into pellets to yield additional product in the 8- to 25-mesh size range. The absorbency of the dried potassium starch graft polymer was about 1200 times its weight in distilled water.

EXAMPLE 5

Samples of the 8- to 25-mesh particles from the MCM method of EXAMPLE 3 were provided to an agricultural company for testing on cantaloupe, tomatoes, and cotton.

a. For cantaloupe testing, the trial area was pre-irrigated and the seeds were planted. The 8- to 25-mesh absorbent was applied in the seeded furrow using a microband ground driven granule applicator. A significant increase in the weight of the plants in the seven lb/a furrow rate as compared to the plants in the untreated control furrow was seen after 18 days. The leaf water potential in the treated plants showed a three bar improvement over the untreated control furrow after 18 days. The plants in the seven lb/a furrow had a greater root weight, plant weight, stem diameter, and plant height when evaluated 25 days after planting and compared to the untreated control furrow. The plants in the seven lb/a furrow started blooming three days before the untreated control furrow, and the crown set were also greater. Weight of the final melon crop was substantially greater in the treated furrows as compared to the untreated control furrows. The trial area received approximately half the amount of water during the growing period that would have normally been used to grow a crop of melons.

b. The tomato testing included two different absorbent polymer treatments, as follows:

In the first treatment, the absorbent polymer particles were placed about two inches below the tomato seeds to evaluate the growth response under drought conditions. In the second treatment, the absorbent polymer particles were placed on the soil surface prior to application of the planter press wheel in order to test soil crusting during sprinkler irrigation. Tomato stand counts made seven days after planting revealed significantly more absorbent polymer-treated tomato plants per 10 feet of soil as compared to per 10 feet of untreated control soil. The larger number of plants in the absorbent polymer-treated soil documents the ability to provide anti-crusting properties. In the untreated control soil and in the first treatment where the absorbent polymer was placed two inches below the seed, a crust formed on the soil surface, restricting tomato emergence. All furrows were then sprinkled with enough water to break the crust, allowing the tomato plants to emerge. Total plant weight (tops and roots) were greatly improved on the furrows where the absorbent particles were placed two inches below the seed as compared to the untreated control furrows and the furrows that had received surface treatments of absorbent polymer particles.

c. The cotton testing involved the application of a seven lb/a absorbent polymer particle treatment which was placed in furrow with the cottonseed. Three evaluations were conducted during the first part of the growing season. The evaluations were done at 11, 18, and 25 days. The cotton showed increased plant height, total plant weight, and root development. Cotton plants with the seven lb/a application rate received only one-half the normal amount of water, yet these treated cotton plants were larger than the untreated control group plants. At harvest, the cotton lint yield from the absorbent polymer treated plot yielded 10% more cotton than the control group despite the fact that these plants had received 50% less water than the control plants.

EXAMPLE 6

Samples of the 8- to 25-mesh absorbent polymer particles made from the ⅛ inch extruded product (EXAMPLE 3, row EP) were provided to an agricultural company for testing on tomatoes and cotton.

a) For tomatoes, rates of absorbency varied: rates of one, two, and four lb/a were applied over the seed row prior to application of the press wheel. Also, absorbent polymer was applied two inches below the tomato seeds at rates of three, seven, and 10 lb/a. A significant increase in the number of tomato plant stands per plot was found for all absorbent polymer treated furrows as compared to the untreated control furrows, documenting anti-crusting properties of the starch graft copolymer. Absorbent polymer applied under the seed effected greater total plant growth compared to absorbent polymer applied to the soil surface or compared to the untreated control plants. Five individual plants were picked at random from each plot, as well as a random 20 feet of each row. There was a significant increase in tomato yield for all absorbent polymer-treated plants as compared to the untreated control plants. The four lb/a treatment effected the greatest tomato yield as compared to the untreated control group and the other absorbent polymer treatments, all of which had lower rates of absorbent addition. The four lb/a treated tomato yield was 38.7 tons per acre compared to 15 tons per acre for the untreated control plants. The seven lb/a treated tomato yield was 39.3 tons per acre compared to 15 tons per acre for the untreated control plants.

EXAMPLE 7

The absorbent polymer described in row MCM of EXAMPLE 3 was evaluated on several seed crops to determine the absorbent polymer's activity and phytotoxicity. The absorbent polymer was applied at levels of four lb/a in the furrow or in a three-inch band over the row. Also, levels of seven lb/a in the furrow or in a three-inch band over the row were evaluated. Soil types were loamy sand or loam. Smaller seeds were planted at a ½ inch depth and larger seeds at a 1-inch depth. Percent emergence was evaluated 3, 5, 7, 10, and 14 days after planting. The following types of seeds were evaluated: alfalfa, asparagus, barley, bean (dry), bell pepper, broccoli, canola, cantaloupe, carrot, cauliflower, celery, coriander, coreopsis, cotton, cucumber, dill, elymus glaucus, field corn, fine fescue, garlic, honeydew, Kentucky bluegrass, lentil, lettuce leaf, lima bean, oat, onion, parsley, pea (dry), pumpkin, radish, rye grass, sorghum, soybean, spinach, squash, sugar beet, sunflower, sweet corn, Swiss chard, tall fescue, tomato, turnip, watermelon, wheat, white clover, wild rye, zinnia.

Emergence varied with the seeds. Interestingly, no phytotoxicity was observed with any of the seeds shown. This demonstrated good activity between the seed and the absorbent.

It is to be understood that the foregoing detailed description of the invention is given by way of illustration and that modification and variations may be made therein without departing from the spirit and scope of the invention. Consequently, it will be obvious to those having skill in the art that many changes may be made to the details of the above-described embodiments without departing from the underlying principles of the invention. The scope of the present invention should, therefore, be determined only by the following claims.

The invention claimed is:

1. A method for increasing crop production, comprising:
applying a plant seed in a furrow;
applying granular starch graft superabsorbent polymer particles in the furrow adjacent to the plant seed, the starch graft superabsorbent polymer particles granularized in a manner such that at least 61 percent of the starch graft superabsorbent polymer particles have a mesh size between 8 mesh to 25 mesh;
applying water to the seed and starch graft superabsorbent polymer particles; and
allowing a plant to grow from the plant seed;
wherein increased crop production is measured from at least one of the following characteristics: plant height, plant weight after cutting the stem at soil level, or plant root weight compared to a control.

2. The method of claim 1, wherein the control is planted under similar conditions absent the application of granular starch graft superabsorbent polymer particles.

3. The method of claim 1, wherein increased crop production is measured from plant height relative to the control.

4. The method of claim 1, wherein increased crop production is measured from plant weight after cutting the stem at soil level relative to the control.

5. The method of claim 1, wherein increased crop production is measured from plant root weight relative to the control.

6. The method of claim 1, wherein applying granular starch graft superabsorbent polymer particles in the furrow comprises applying granular starch graft superabsorbent polymer particles via a granule applicator.

7. The method of claim 1, wherein applying granular starch graft superabsorbent polymer particles in the furrow comprises applying granular starch graft superabsorbent polymer particles at a rate of at least 7 pounds per acre.

8. The method of claim 1, wherein applying granular starch graft superabsorbent polymer particles comprises applying superabsorbent polymer particles formed from graft polymerizing a monomer onto a starch in the presence of an initiator to form a starch graft copolymer.

9. The method of claim 1, wherein applying granular starch graft superabsorbent polymer particles comprises applying granular starch graft superabsorbent polymer particles having an absorbency ranging between 200 to 600 grams of water per gram of superabsorbent polymer.

10. The method of claim 1, wherein applying granular starch graft superabsorbent polymer particles comprises applying granular starch graft superabsorbent polymer particles having an absorbency ranging between 400 to 600 grams of water per gram of superabsorbent polymer.

11. A method for increasing crop production, comprising:
applying a plant seed to soil;
applying granular starch graft superabsorbent polymer particles to the soil in proximity to the plant seed, the starch graft superabsorbent polymer particles granularized in a manner such that at least 61 percent of the starch graft superabsorbent polymer particles have a mesh size between 8 mesh to 25 mesh;
applying water to the seed and starch graft superabsorbent polymer particles; and
allowing a plant to grow from the plant seed;
wherein crop production is increased as compared to a control planted under similar conditions absent the application of granular starch graft superabsorbent polymer particles, and wherein increased crop production is measured from at least one of the following characteristics: plant height, plant weight after cutting the stem at soil level, or plant root weight.

12. The method of claim 11, wherein applying granular starch graft superabsorbent polymer particles to the soil in proximity to the plant seed comprises applying the superabsorbent polymer particles into the soil below the seed.

13. The method of claim 11, wherein applying granular starch graft superabsorbent polymer particles to the soil in proximity to the plant seed comprises applying the superabsorbent polymer particles over the top of the seed adjacent to the soil surface.

14. The method of claim 11, wherein applying granular starch graft superabsorbent polymer particles comprises applying superabsorbent polymer particles formed from a process comprising:
providing grafting reactants and a starch;
graft polymerizing the grafting reactants onto the starch to form a starch graft copolymer;
saponifying the starch graft copolymer to form a saponificate;
precipitating the saponified starch graft copolymer; and
granularizing the precipitated starch graft copolymer.

15. The method of claim 11, wherein applying granular starch graft superabsorbent polymer particles comprises applying superabsorbent polymer particles formed from a process comprising:
providing grafting reactants and a starch;
graft polymerizing the grafting reactants onto the starch to form a starch graft copolymer;
saponifying the starch graft copolymer to form a saponificate;
precipitating the saponified starch graft copolymer; and
granularizing the precipitated starch graft copolymer such that at least 84 percent of the starch graft copolymer granules have a particle size between 8 mesh and 25 mesh.

16. The method of claim 11, wherein the plant seed is chosen from: alfalfa, asparagus, barley, bean, bell pepper, broccoli, canola, cantaloupe, carrot, cauliflower, celery, coriander, coreopsis, cotton, cucumber, dill, elymus glaucus, field corn, fine fescue, garlic, honeydew, Kentucky bluegrass, lentil, lettuce leaf, lima bean, oat, onion, parsley, pea, pumpkin, radish, rye grass, sorghum, soybean, spinach, squash, sugar beet, sunflower, sweet corn, Swiss chard, tall fescue, tomato, turnip, watermelon, wheat, white clover, wild rye, and zinnia.

* * * * *